Figure 1:
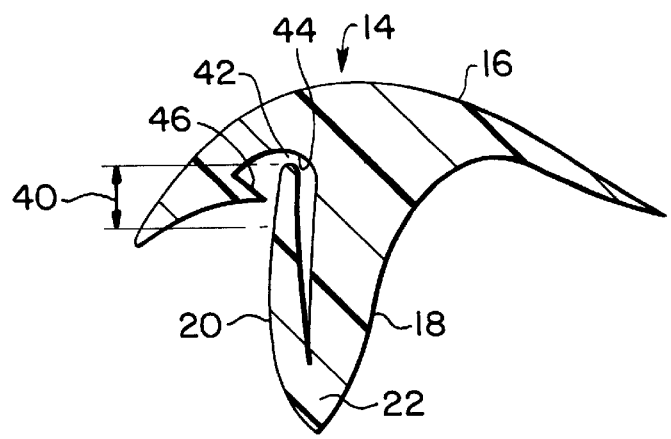

United States Patent [19]
Gold

[11] Patent Number: 5,826,933
[45] Date of Patent: Oct. 27, 1998

[54] AUTO GRIPPER MOLDING WITH MECHANICAL INTERLOCK

[76] Inventor: Peter Gold, 465 N. Wood Rd., Rockville Centre, N.Y. 11570

[21] Appl. No.: 599,059

[22] Filed: Feb. 9, 1996

[51] Int. Cl.$^6$ ................................................ B60J 10/02
[52] U.S. Cl. .................................................. 296/93
[58] Field of Search ............................. 296/93, 146.15

[56] References Cited

U.S. PATENT DOCUMENTS

| | | | |
|---|---|---|---|
| 4,905,432 | 3/1990 | Romie | 296/93 |
| 5,039,157 | 8/1991 | Yada | 296/93 |
| 5,222,336 | 6/1993 | Yada et al. | 296/93 |
| 5,311,711 | 5/1994 | Desir | 296/93 |
| 5,480,207 | 1/1996 | Gold | 296/93 |
| 5,480,504 | 1/1996 | Gold | 296/93 |

*Primary Examiner*—Gary C. Hoge
*Attorney, Agent, or Firm*—Myron Amer PC

[57] ABSTRACT

An auto gripper molding having a notch in the surface of its inner crown overhang in facing relation to the windshield exterior surface which notch serves firstly to receive an end of the molding gripping leg having accordingly a desired longer length, and serves secondly to have deposited therein, after the gripper leg is moved into its windshield-gripping location, a viscous mass of urethane which cures in the notch and provides a mechanical interlock between the gripper molding and the windshield.

1 Claim, 1 Drawing Sheet

AUTO GRIPPER MOLDING WITH MECHANICAL INTERLOCK

The present invention relates generally to auto windshield moldings used to enhance the utility of the windshield in its seated position in an auto windshield opening, of which there are two broad classifications, namely moldings that are inserted in the gap between the windshield peripheral edge and the wall bounding the windshield opening known as "insert" moldings, and moldings that prior to the windshield installation are grippingly engaged about the windshield peripheral edge known as "gripper" moldings, the present invention being more specifically related to improvements for the latter classification of gripper moldings.

EXAMPLES OF THE PRIOR ART

There are numerous prior patents which illustrate and describe gripper-type auto moldings, two such patents being exemplified by U.S. Pat. No. 4,765,673 and U.S. Pat. No. 5,009,462, both entitled "Windshield Reveal Molding", the former having issued to Peter W. Frabotta et al. on Aug. 23, 1988 and the latter having issued to Ricky V. Katcherian on Apr. 23, 1991. These and other gripper moldings protect the windshield peripheral edge against chipping during handling, as one example of their utility, by their strategic location about the windshield resulting from the peripheral edge thereof having an operative inserted position within a C-shaped compartment of the gripper molding.

A tradeoff for the utility noted is that the gripper molding will inadvertently on occasion become detached from the windshield since its grip thereto is primarily a function of the urgency of its rubber construction material and the friction grip this urgency provides which grip, it is important to note cannot effectively be supplemented adhesively, such as by using urethane the adhesive of choice because of its bonding strength, because urethane is chemically inert to and thus will not effectively bond to rubber.

Broadly, it is an object of the present invention to provide a rubber gripper molding overcoming the foregoing and other shortcomings of the prior art.

More particularly, it is an object to achieve a shaped urethane bond which can be made to the glass construction material of the windshield and, using to advantage the shape of said urethane bond, mechanically interlocking the gripper molding thereto, to the end of obviating inadvertent disengagement of the gripper molding from the windshield, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figure 2:
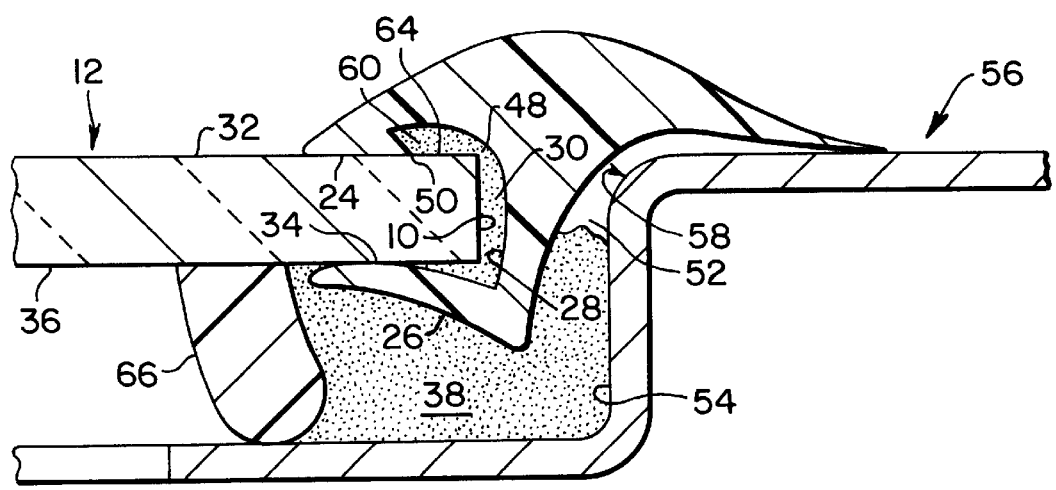

FIG. 1 is an isolated cross sectional view of the within inventive auto windshield gripper molding; and FIG. 2 is a similar cross sectional view illustrating the installation of the gripper molding about the peripheral edge of the windshield.

A known and proven technique of obviating chipping, both prior to and during installation, in the peripheral edge 10 of an auto windshield 12 as might be due to rough handling or the like, contemplates the protective placement about the windshield peripheral edge 10 of what is known in trade parlance and also in patent literature, as exemplified by U.S. Pat. No. 5,009,462 issued on Apr. 23, 1991, of a gripper molding, generally designated 14, having an upper crown 16, a first leg 18 depending from the crown, and a second leg 20 connected, as at 22, from the free end of leg 18 so that the underside crown surface 24 and inboard leg surfaces 26 and 28 cooperate to bound a windshield peripheral edge-gripping compartment 30. In use, with the windshield peripheral edge 10 in its inserted operative condition within the compartment 30, the gripping engagement of the gripper molding 14 on the edge 10 is primarily a function of the urgency in the rubber construction of the molding 14 exerted in opposite directions by the crown surface 24 upon the windshield exterior surface 32 and by the leg surface 34 of the leg 20 against the windshield underside surface 36.

The use of an adhesive, which by popular choice is usually urethane 38 because initially it is a viscous mass and amenable to facilitated placement and subsequently cures or hardens into a solid with significant bonding strength, is of nominal effectiveness in supplementing the pre-installation engagement of the gripper molding 14 to the windshield edge 10 because, as is well known, rubber is chemically inert to urethane and an adhesive bond therebetween cannot be achieved. Glass, however, is not chemically inert to urethane and thus a strong adhesive bond therebetween is possible, and this phenomenon is used to advantage to achieve a mechanical interlock between the gripper molding 14 and the windshield peripheral edge 10.

Referring to FIG. 1, molding 14 is initially extruded of rubber construction material with a profile or cross-sectional shape characterized in that leg 20 extends approximately in parallel relation to leg 18 and is sized lengthwise to exceed the lengthwise size of leg 18 by the length portion 40. Length portion 40 is accounted for by being received in a notch 42 bounded by wall means, generally designated 44, in crown surface 24, said wall means 44 being characterized by an angularly inclined wall length portion 46 which, in the installed FIG. 2 condition of molding 14 is in the direction of the windshield corner 48 and is in contact at its free edge 50 with the windshield outside surface 32 inwardly of the corner 48. After the gripper molding 14 is in place around the windshield peripheral edge 10, the underside crown surface 24 is lifted off of the external windshield surface 32 providing access to the notch 42 and a viscous mass of urethane 60 deposited in the notch 42 using a so-called pump gun whereupon the urethane 60 cures into a hardened condition in the notch 42.

Thus, in addition to cured or hardened urethane 38 exerting holding pressure on leg 18 in the gap area 52 between the wall 54 of the flange 56 which bounds the auto windshield opening 58, there is also hardened urethane 60 in the notch 42 and, most importantly above the inclined wall 46 and adhesively secured, as at 64, to the windshield surface 32, said strategically located hardened urethane, designated 60 in FIG. 2, being effective in practice to establish a mechanical interlock between the gripper molding 14 and the windshield peripheral edge 10.

For completeness' sake it is noted that urethane 38 is contained by a dam 66 depending from an adhesive attachment to the windshield surface 36 into contact with the other transverse leg 68 of the flange, being deposited in the gap area 52 during installation of the assembly of the encircling mechanically interlocked gripper molding 14 about the windshield peripheral edge 10 into the auto windshield opening.

While the mechanically interlocking gripper molding herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. For installation about a peripheral edge of an auto windshield a gripper molding of a type having a cross sectional shape formed by an upper crown, a first leg depending from said crown, and a second leg connected to extend from a free end of said first leg in parallel relation to said crown, said crown and first and second legs cooperating to bound a windshield peripheral edge-gripping compartment to receive in inserted relation therein said auto windshield peripheral edge, the improvements to said gripper molding for providing a mechanical interlock between said windshield peripheral edge and said gripper molding comprising said second leg modified to extend from said connection to said first leg in parallel relation to said first leg and sized to exceed in length the size of said depending length of said first leg, a surface in said crown in facing relation to said windshield peripheral edge-gripping compartment having wall means bounding a notch of a selected cross sectional shape and located to receive in projected relation therein said size-exceeding length portion of said second leg, said second leg being adapted to be urged through a pivotal traverse from said notch to an operative position beneath said windshield peripheral edge effective to grippingly engage said auto windshield peripheral edge in inserted position in said windshield peripheral edge-gripping compartment, and said notch wall means including an angularly inclined wall inclined in the direction of a corner of said windshield peripheral edge and having an operative position in contact inwardly of an outer surface of said windshield forming a plane of said corner of said windshield peripheral edge, and urethane deposited in said notch, whereby said urethane is effective to harden in bonded relation to said windshield outer surface and also above said notch inclined wall to thereby contribute to providing a mechanical interlock between said windshield peripheral edge and said gripper molding.

* * * * *